(12) United States Patent
Elsherif et al.

(10) Patent No.: US 9,860,765 B2
(45) Date of Patent: Jan. 2, 2018

(54) DOPPLER PROFILE ESTIMATION USING COMPRESSED BEAMFORMING INFORMATION

(71) Applicant: QUALCOMM Incorporated, San Diego, CA (US)

(72) Inventors: Ahmed Ragab Elsherif, Santa Clara, CA (US); Qinghai Gao, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 14/968,321

(22) Filed: Dec. 14, 2015

(65) Prior Publication Data

US 2017/0064568 A1    Mar. 2, 2017

Related U.S. Application Data

(60) Provisional application No. 62/212,895, filed on Sep. 1, 2015.

(51) Int. Cl.
*H04W 24/02*     (2009.01)
*H04B 7/04*      (2017.01)
(Continued)

(52) U.S. Cl.
CPC .......... *H04W 24/02* (2013.01); *H04B 7/0417* (2013.01); *H04B 7/0452* (2013.01);
(Continued)

(58) Field of Classification Search
CPC ...... H04B 7/04; H04B 7/0417; H04B 7/0452; H04B 7/06; H04B 7/0617; H04B 7/041;
(Continued)

(56) References Cited

U.S. PATENT DOCUMENTS 8,150,433 B2 *   4/2012   Liu ...................... H04B 7/0639
                                                        455/504
8,488,703 B2     4/2013   Wild et al.
(Continued)

FOREIGN PATENT DOCUMENTS

WO    WO-2013139035 A1    9/2013

OTHER PUBLICATIONS

Feukeu, E.A., et al., "An MCS Adaptation Technique for Doppler Effect in IEEE 802.11p Vehicular Networks", PROCEDIA Computer Science, Jan. 1, 2013, pp. 570-577, vol. 19, ISSN: 1877-0509, DOI: 10.1016/j.procs.2013.06.076, XP055299886, Amsterdam, NL.

(Continued)

*Primary Examiner* — Tri H Phan
(74) *Attorney, Agent, or Firm* — Holland & Hart LLP/Qualcomm

(57) ABSTRACT

Methods, systems, and devices are described for wireless communication. In one aspect, a method of wireless communication includes receiving, by a first wireless device, beamforming information from a station over a period of time, the beamforming information including a feedback signal-to-noise ratio (SNR) value and compressed feedback matrix. The method also includes determining one or more SNR gradient metrics for the station based at least in part on the received feedback SNR values and the received compressed feedback matrices.

30 Claims, 7 Drawing Sheets

(51) Int. Cl.
  *H04L 1/00* (2006.01)
  *H04L 5/00* (2006.01)
  *H04B 7/0417* (2017.01)
  *H04B 7/0452* (2017.01)
  *H04B 7/06* (2006.01)
  *H04L 25/02* (2006.01)
  *G01S 11/10* (2006.01)

(52) U.S. Cl.
  CPC .......... *H04B 7/0617* (2013.01); *H04L 1/0009* (2013.01); *H04L 5/006* (2013.01); *H04L 25/0222* (2013.01); *G01S 11/10* (2013.01)

(58) Field of Classification Search
  CPC ....... H04B 17/336; H04L 1/00; H04L 1/0009; H04L 5/00; H04L 5/006; H04L 25/02; H04L 25/0222; H04W 24/02; G01S 11/10
  See application file for complete search history.

(56) References Cited

U.S. PATENT DOCUMENTS

| | | | | |
|---|---|---|---|---|
| 9,071,435 B2* | 6/2015 | Shany | ................. | H04B 7/0452 |
| 9,509,391 B2* | 11/2016 | Vermani | .............. | H04B 7/0452 |
| 9,577,728 B1* | 2/2017 | van Nee | .............. | H04B 7/0452 |
| 9,590,707 B1* | 3/2017 | Baik | ............... | H04L 5/006 |
| 9,647,745 B2* | 5/2017 | Sidiropoulos | ........ | H04B 7/0626 |
| 9,781,615 B2* | 10/2017 | You | ....................... | H04W 24/06 |
| 2007/0147533 A1* | 6/2007 | Thomas | ............... | H04B 7/0617 375/267 |
| 2010/0311430 A1 | 12/2010 | Katayama et al. | | |
| 2011/0199968 A1* | 8/2011 | Kim | .................... | H04B 7/0617 370/328 |
| 2012/0275376 A1 | 11/2012 | Sampath et al. | | |
| 2013/0301454 A1* | 11/2013 | Seol | ....................... | H04B 7/043 370/252 |
| 2014/0064396 A1 | 3/2014 | Van Zelst et al. | | |
| 2014/0093005 A1 | 4/2014 | Xia et al. | | |
| 2014/0254648 A1 | 9/2014 | Van Nee | | |
| 2014/0307645 A1 | 10/2014 | Ji et al. | | |
| 2015/0288425 A1* | 10/2015 | Kim | .................... | H04L 27/2657 370/329 |
| 2016/0295513 A1* | 10/2016 | Moon | .................. | H04L 5/0023 |
| 2017/0064566 A1* | 3/2017 | Elsherif | ............... | H04W 16/28 |

OTHER PUBLICATIONS

ISA/EP, International Search Report and Written Opinion of the International Searching Authority, Int'l Application No. PCT/US2016/040528, dated Oct. 10, 2016, European Patent Office, Rijswijk, NL, 15 pgs.

Lou H., et al., "A Comparison of Implicit and Explicit Channel Feedback Methods for MU-MIMO WLAN Systems", the 24th IEEE Annual International Symposium on Personal, Indoor, and Mobile Radio Communications Proceedings (PIMRC 2013), Sep. 1, 2013, 6 pgs, XP055299650, DOI: 10.1109/PIMRC.2013.6666172 ISBN: 978-1-4673-6235-1, Institute of Electrical and Electronics Enginners.

* cited by examiner

DOPPLER PROFILE ESTIMATION USING COMPRESSED BEAMFORMING INFORMATION

CROSS REFERENCES

The present application for patent claims priority to U.S. Provisional Patent Application No. 62/212,895 by Elsherif et al., entitled "Doppler Profile Estimation using Compressed Beamforming Information," filed Sep. 1, 2015, assigned to the assignee hereof, and expressly incorporated by reference herein.

BACKGROUND

Field of the Disclosure

The present disclosure, for example, relates to wireless communication systems, and more particularly to estimating Doppler profiles using compressed beamforming information.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless local area network (WLAN) is an example of a multiple-access system and are widely deployed and used. Other examples of multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, may include an access point (AP) that may communicate with one or more stations (STAs) or mobile devices. In some cases, the AP may communicate with more than one STA simultaneously in a multi-user MIMO (MU-MIMO) transmission. The AP may assign a group of STAs to a MU-MIMO group and send a MIMO transmission to the group of STAs assigned to the MU-MIMO group. With opportunistic scheduling, the AP may change the STAs assigned to the MU-MIMO group during every sounding period based on, for example, availability of traffic, modulation and coding scheme (MCS) compatibility, etc. However, an improper assessment of the wireless channel between the AP and a given STA can lead to unsuitable MCS determinations, ineffective MU-MIMO groupings, etc.

SUMMARY

The present description discloses techniques for estimating Doppler profiles using beamforming information (e.g., compressed beamforming information and, in some cases, non-compressed beamforming information). According to these techniques, a wireless communication device (e.g., an AP or like device) receives compressed beamforming information from a STA over a period of time. For example, wireless communication device performs channel sounding procedures during successive sounding intervals and receives compressed beamforming information from a number of STAs (e.g., two through eight STAs in some implementations). The compressed beamforming information associated with each STA responding to the channel sounding includes a feedback signal-to-noise ratio (SNR) value and a compressed feedback matrix.

The wireless communication device determines one or more SNR gradient metrics for the STA based at least in part on the received feedback SNR values and the received compressed feedback matrices (e.g., from the multiple channel sounding procedures associated with the STA). Additionally, the wireless communication device determines a Doppler gradient metric based at least in part on the SNR gradient metric(s). The wireless communication device similarly determines SNR gradient and Doppler gradient metrics for some or all of the number of STAs.

A method for wireless communication is described. In some examples, the method includes receiving, by a first wireless device, beamforming information from a station over a period of time, the beamforming information including a feedback signal-to-noise ratio (SNR) value and compressed feedback matrix, and determining one or more SNR gradient metrics for the station based at least in part on the received feedback SNR values and the received compressed feedback matrices.

A communication device is described. In some example, the communication device includes a transceiver to receive beamforming information from a station over a period of time, the beamforming information including a feedback signal-to-noise ratio (SNR) value and compressed feedback matrix, and an SNR gradient estimator to determine one or more SNR gradient metrics for the station based at least in part on the received feedback SNR values and the received compressed feedback matrices.

Another communication device includes means for receiving beamforming information from a station over a period of time, the beamforming information including a feedback signal-to-noise ratio (SNR) value and compressed feedback matrix, and means for determining one or more SNR gradient metrics for the station based at least in part on the received feedback SNR values and the received compressed feedback matrices.

A non-transitory computer-readable medium storing code for wireless communication is described. The code of the non-transitory computer-readable medium includes instructions executable to cause at least one communications device to receive beamforming information from a station over a period of time, the beamforming information including a feedback signal-to-noise ratio (SNR) value and compressed feedback matrix, and determine one or more SNR gradient metrics for the station based at least in part on the received feedback SNR values and the received compressed feedback matrices.

Regarding the above-described method, communication devices, and non-transitory computer-readable medium, a Doppler gradient metric can be determined based at least in part on the one or more SNR gradient metrics. A modulation and coding scheme of the station can be set based at least in part on a classification of the Doppler gradient metric. A sounding procedure interval of the station can be modified based at least in part on a classification of the Doppler gradient metric. A multi-user transmission group of the station can be determined based at least in part on a classification of the Doppler gradient metric.

Determining the one or more SNR gradient metrics for the station can comprise averaging a plurality of SNR gradient values associated with a particular time interval. Determining the one or more SNR gradient metrics for the station can comprise determining a single-user SNR gradient metric associated with single-user transmissions. Determining the one or more SNR gradient metrics for the station can comprise determining a multi-user SNR gradient metric associated with multi-user transmissions. Determining the one or more SNR gradient metrics for the station can comprises determining different multi-user SNR gradient metrics for multi-user transmissions associated with different numbers of stations.

The beamforming information from the station received over the period of time can be associated with a plurality of sounding procedures associated with the station. The beamforming information from the station received over the period of time can be stored.

Further scope of the applicability of the described systems, methods, devices, or computer-readable media will become apparent from the following detailed description, claims, and drawings. The detailed description and specific examples are given by way of illustration only, and various changes and modifications within the scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
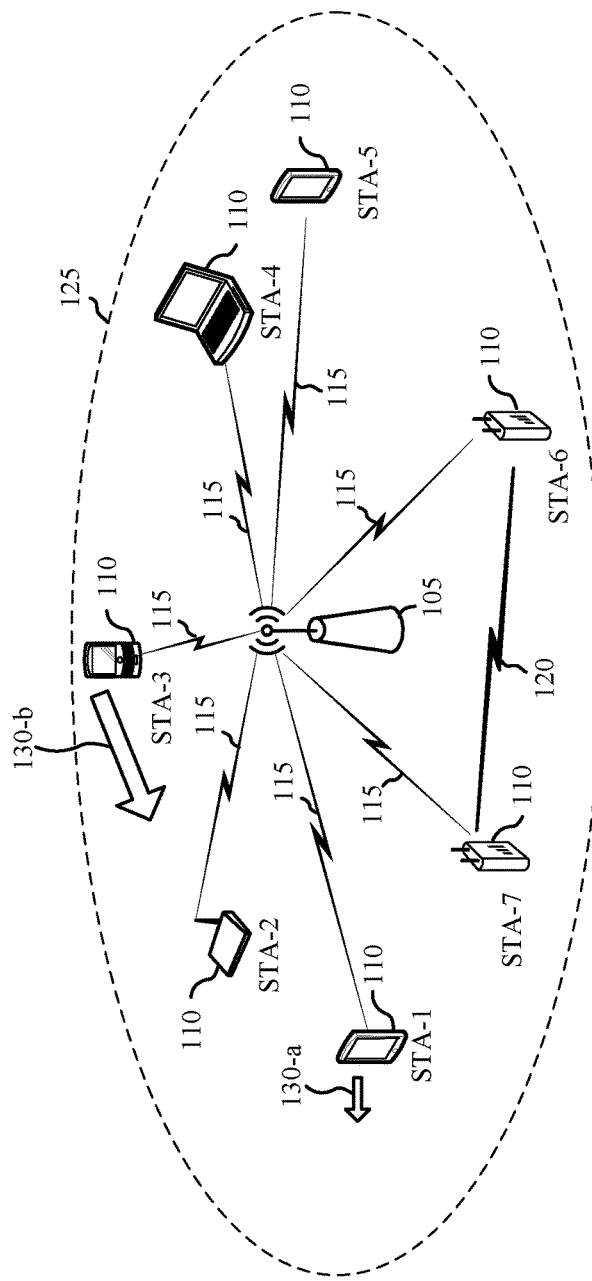
FIG. 1 illustrates an example of a wireless communication system, such as a WLAN, that supports using compressed beamforming information to estimate Doppler profiles in accordance with various aspects of the present disclosure.

According to aspects of the present disclosure a wireless communication device, such as an access point (AP), uses beamforming information to estimate Doppler profiles of other devices, such as stations (STAs). The Doppler profiles of the STAs are used in various multiple-input multiple-output (MIMO) operations. The AP receives beamforming information (e.g., compressed beamforming information and, in some cases, non-compressed beamforming information) from a number of STAs over a period of time. For example, the AP performs multi-user and single-user channel sounding procedures during successive sounding intervals and receives compressed beamforming information from the number of STAs. The AP determines the SNR gradient metrics for each STA based at least in part on the compressed beamforming information received over the period of time for that respective STA. In this regard, the AP uses compressed beamforming information from only a few channel sounding procedures or several hundred channel sounding procedures.

In some examples, the AP determines a beamforming steering matrix associated with each STA. The beamforming steering matrix is based at least in part on the received compressed beamforming information, and is used to determine the SNR gradient metrics for the respective STAs. The SNR gradient metrics provide an indication to the AP regarding the Doppler profile and how fast or slow the wireless channel of each STA varies. In this regard, the AP determines Doppler gradient metrics for the respective STAs based at least in part on the SNR gradient metrics.

In accordance with some examples, the AP sets a modulation and coding scheme (MCS) of a particular station based at least in part on a classification of the Doppler gradient metric. In this regard, the Doppler gradient metric provides predictive insight to the AP regarding how the wireless channel of that particular STA will change (or not change). This predictive insight advantageously provides the AP with information to determine and set a suitable MCS for that STA. In other examples, the AP modifies a sounding procedure interval of a particular STA (and/or group of STAs) based at least in part on a classification of the Doppler gradient metric(s). The AP also forms multi-user transmission groups based at least in part on the Doppler gradient metrics of the STAs.

Packet error rate (PER) history, which is considered a purely reactive approach to setting an MSC, assessing a sounding interval, or determining other MIMO operations, does not provide a complete picture of the frequently changing wireless channel. However, the SNR gradient and Doppler gradient metrics techniques described herein, either alone or in combination with PER history, provide an insightful and accurate assessment of the wireless channel between the AP and a particular STA.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a wireless local area network (WLAN) 100 in accordance with various aspects of the present disclosure. The WLAN 100 includes an access point (AP) 105 and STAs 110 labeled as STA-1 through STA-7. The STAs 110 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc. While only one AP 105 is illustrated, the WLAN 100 can alternatively have multiple APs 105. STAs 110, can also be referred to as a mobile stations (MS), mobile devices, access terminals (ATs), user equipment (UEs), subscriber stations (SSs), or subscriber units. The STAs 110 associate and communicate with the AP 105 via a communication link 115. Each AP 105 has a coverage area 125 such that STAs 110 within that area are within range of the AP 105. The STAs 110 are dispersed throughout the coverage area 125. Each STA 110 may be stationary or mobile. Additionally, each AP 105 and STA 110 can have multiple antennas.

While, the STAs 110 are capable of communicating with each other through the AP 105 using communication links 115, STAs 110 can also communicate directly with each other via direct wireless communication links 120. Direct wireless communication links can occur between STAs 110 regardless of whether any of the STAs is connected to an AP 105. As such, a STA 110 or like device can include techniques for using compressed beamforming information to determine Doppler profiles as described herein with respect to an AP 105.

The STAs 110 and AP 105 shown in FIG. 1 communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11z, 802.11ax, etc. Thus, WLAN 100 implements a contention-based protocol that allows a number of devices (e.g., STAs 110 and APs 105) to share the same wireless medium (e.g., a channel). To prevent several devices from transmitting over the channel at the same time each device in a BSS operates according to certain procedures that structure and organize medium access, thereby mitigating interference between the devices.

In WLAN 100, AP 105 utilizes techniques for using compressed beamforming information (e.g., very high throughput (VHT) compressed beamforming (CBF) report information) for estimating Doppler profiles. AP 105 utilizes certain transmission techniques such as MIMO and MU-MIMO. A MIMO communication typically involves multiple transmitter antennas (e.g., at an AP 105) sending a signal or signals to multiple receive antennas (e.g., at an STA 110). Each transmitting antenna transmits independent data (or spatial) streams to increase spatial diversity and the likelihood of successful signal reception. In other words, MIMO techniques use multiple antennas on AP 105 and/or multiple antennas on a STA 110 in the coverage area 125 to take advantage of multipath environments to transmit multiple data streams.

AP 105 also implements MU-MIMO transmissions in which AP 105 simultaneously transmits independent data streams to multiple STAs 110. In one example of an MU-N transmission (e.g., MU-2, MU-3, MU-4, etc.), an AP 105 simultaneously transmits signals to N STAs. Thus, when AP 105 has traffic for many STAs 110, the AP 105 increases network throughput by aggregating individual streams for each STA 110 in the group into a single MU-MIMO transmission.

In implementing various MU-MIMO techniques and operations, AP 105 (e.g., beamformer device) relies on multi-user channel sounding procedures performed with the STAs 110 (e.g., beamformee devices) in the coverage area 125 to determine how to radiate energy in a preferred direction. AP 105 sounds the channel by transmitting null data packet announcement (NDPA) frames and null data packet (NDP) frames to a number of STAs 110 such as STA-1, STA-2, STA-3, STA-4, STA-5, and STA-6. AP 105 has knowledge that STA-7 does not support MU-MIMO operations, for instance, and does not include STA-7 in the multi-user channel sounding procedure.

AP 105 also transmits a beamforming report poll frame after the NDPA and NDP frames to coordinate and collect responses from the number of STAs 110. Each of the STAs 110 responds in turn with a compressed beamforming action frame (e.g., a VHT CBF frame) for transmitting VHT CBF feedback to AP 105. The VHT CBF feedback contains the VHT CBF report information, portions of which the AP 105 uses to determine SNR gradient metrics and Doppler gradient metrics for the number of STAs 110.

The VHT CBF report information includes feedback information such as compressed beamforming feedback matrix V compressed in the form of angles (i.e., phi $\Phi$ and psi $\Psi$ angles) that are quantized according to a standard (e.g., IEEE 802.11ac). The VHT CBF report information also includes a feedback signal-to-noise ratio (SNR) value (e.g., an Average SNR of Space-Time Stream Nc, where Nc is the number of columns in the compressed beamforming feedback matrix V). Each SNR value per tone in stream i (before being averaged) corresponds to the SNR associated with the column i of the beamforming feedback matrix V determined at the STA 110. The feedback SNR values are based on the NDP frames in the channel sounding procedure, and therefore each of these feedback SNR values generally corresponds to a SNR that a particular STA 110 may experience in a single-user (SU) transmission from AP 105 to the particular STA 110.

In implementing certain SU transmission (e.g., MIMO) techniques and operations, AP 105 (e.g., beamformer device) relies on single-user channel sounding procedures performed with a particular STA 110 (e.g., beamformee device with multiple receive antennas) in the coverage area 125 to determine how to radiate energy to that particular STA. AP 105 sounds the channel by transmitting null data packet announcement (NDPA) frames and null data packet (NDP) frames to a particular of STA 110 such as STA-7. That particular STA 110 responds with a compressed beamforming action frame (e.g., a VHT CBF frame) for transmitting VHT CBF feedback to AP 105. The VHT CBF feedback contains the VHT CBF report information, similar to that described above with respect to the multi-user channel sounding procedures.

Certain STAs 110 may be moving at different rates and therefore the instantaneous channel measurement information derived from a channel sounding procedure may not provide a complete picture of the wireless channel. For example, STA-1 is moving 130-$a$ at a slow to medium rate generally away from AP 105, whereas STA-2 and STA-4 are stationary. STA-3 is moving 130-$b$ at a fast rate generally tangential to the serving area. In this manner, a received signal by STA-3 associated with a single-user transmission from AP 105 may be less affected by the movement of STA than a received signal associated with a multi-user transmission where spatial streams are more narrowly focused and interference from spatial streams intended for other STAs is exacerbated.

In some cases, channel measurement information is precise enough for approximately 0.1 seconds such that an effecting beamforming calculation can result. In other cases, such as MU-MIMO transmission with a large number of moving STAs 110, channel measurement information is only precise enough for approximately 0.01 seconds. However, in other cases, such as SU transmission to a stationary STA 110, channel measurement information remains precise enough for beamforming calculations for approximately 1 to 2 seconds. As such, sounding intervals are changed based at least in part on Doppler profiles of the STAs 110.

In some examples AP 105, collects the VHT CBF report information from STA 110s obtained from multiple multi-user and single-user channel sounding procedures and uses the feedback information to determine SNR metrics and beamforming steering matrices. In some cases, a first set of Doppler gradient metrics are determined using only compressed beamforming information obtained during multi-user channel sounding procedures, and a second set of Doppler gradient metrics are determined using only compressed beamforming information obtained during single-user channel sounding procedures. It is to be understood that the channel sounding procedures described herein are provided as non-limiting examples. Other channel sounding procedures for obtaining compressed beamforming information can be used to determine Doppler profiles as would be apparent to a skilled person given the benefit of the present disclosure.

Figure 2:
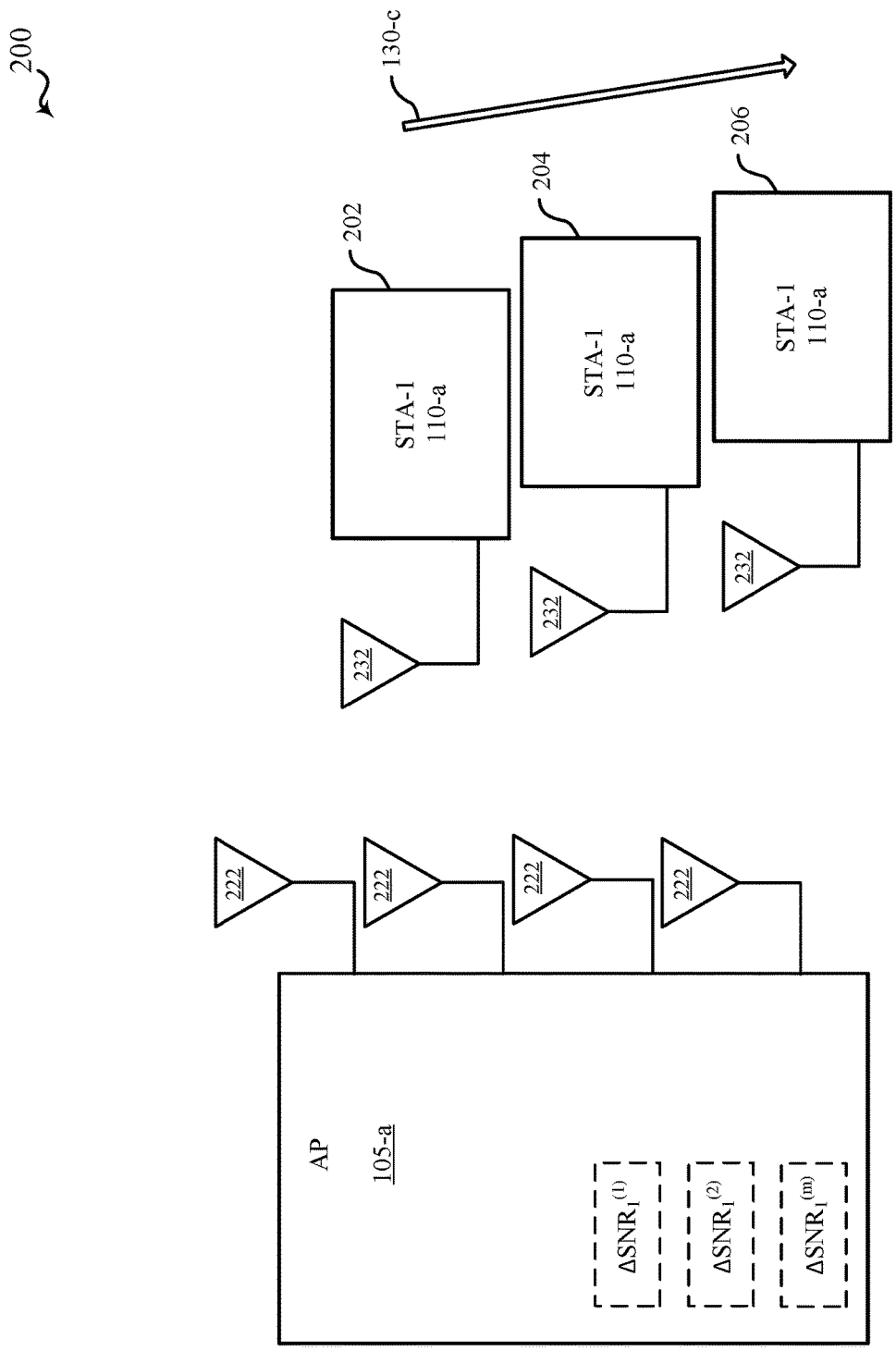
FIG. 2 illustrates an example wireless communications scenario in which a beamformer wireless device determines SNR gradient metrics associated with a beamformee wireless device in accordance with various aspects of the present disclosure.

FIG. 2 illustrates an example wireless communications scenario 200 in which a beamformer wireless device determines SNR gradient metrics associated with a beamformee wireless device in accordance with various aspects of the present disclosure. The example wireless communications scenario 200 shown in FIG. 2 is illustrated with respect to AP 105-a and STA 110-a, which are respective examples of the AP 105 and STAs 110 of FIG. 1. In this example, AP 105-a has received VHT CBF report information from multiple STAs 110, including STA-1 (depicted as STA 110-a in FIG. 2) over multiple sounding periods. AP 105-a analyzes the SNR of STA-1 with respect to SU transmission and MU-MIMO transmissions having MU-2, MU-3, and MU-4 groupings.

For example, AP 105-a analyzes the SNR of STA-1 with respect to MU-3 MU-MIMO transmissions. The AP 105-a determines a first MU-3 MIMO transmission that included STA-1 110-a to also include STA-2 and STA-3 (as shown in FIG. 1). In the example wireless communications scenario 200, the number of transmit antennas 222 at AP 105-a is 4, and the number of receive antennas 233 at STA-1 110-a is 1. During a multi-user sounding procedure, STA-1 estimates the wireless channel H and decomposes the wireless channel estimate H using a singular value decompression (SVD) operation such as $H_i = U_i S_i V_i^*$, where $U_i$ is a unitary matrix associated with the number of receive antennas, $S_i$ represents the feedback SNR value, $V_i^*$ is the feedback matrix, and i represents the particular STA (e.g., STA-1 110-a in this example). Similar channel estimate operations are performed by the other STAs 110 (including STA-2 and STA-3 in this example) during the multi-user sounding procedure.

AP 105-a receives the compressed beamforming information and decompresses or decomposes the compressed beamforming feedback matrix V from the compressed beamforming information provided by STA-1 110-a during the channel sounding procedure. AP 105-a constructs feedback matrix $V_i^*$ and obtains feedback SNR value $S_i$ (e.g., average SNR reported in the VHT CBF report information). AP 105-a uses $S_i$ and $V_i^*$ for each STA (e.g., STA-1, STA-2, and STA-3 in this example) to calculate a beamforming steering matrix W. In this example, the beamforming steering matrix $W^{(t)}$ is the beamforming steering matrix at sounding instant t for the steering matrix for an MU-3 MU-MIMO transmission to STA-1 110-a, STA-2, and STA-3.

AP 105-a calculates an instantaneous SNR for STA-1 110-a as $|S_i^{(t)} V_i^{*(t)} W^{(t)}|^2$, where $S_i^{(t)}$ and $V_i^{*(t)}$ are the S and $V_i^*$ matrix for STA i (STA-1 110-a in this example) at sounding instant t and $W^{(t)}$ is the beamforming matrix at sounding instant t. In this example, unity noise power is assumed. AP 105-a stores the beamforming steering matrix $W^{(t)}$ and uses the beamforming steering matrix $W^{(t)}$ for calculating the SNR gradient metric (e.g., a change of the SNR over time) at subsequent sounding intervals, $t+T_s$, $t+2T_s$, $t+3T_s$, etc., where $T_s$ is the sounding interval (e.g., the interval between receiving two consecutive VHT CBF reports for the same STA 110). AP 105-a determines the SNR gradient metrics with respect to each STA 110 where i represents the particular STA (e.g., STA-1 110-a in this example) as follows:

$$\Delta SNR_i^{(1)} = \frac{|S_i^{(t+T_s)} V_i^{*(t+T_s)} W^{(t)}|^2 - |S_i^{(t)} V_i^{*(t)} W^{(t)}|^2}{T_s}$$

The AP 105-a determines additional SNR gradient metrics for two sounding intervals $2T_s$ (e.g., a time interval between receiving two consecutive VHT CBF reports for the same STA 110) as follows:

$$\Delta SNR_i^{(2)} = \frac{|S_i^{(t+2T_s)} V_i^{*(t+2T_s)} W^{(t)}|^2 - |S_i^{(t+T_s)} V_i^{*(t+T_s)} W^{(t)}|^2}{T_s}$$

In general, AP 105-a determines the SNR gradient metrics with respect to each STA 110 for a given multiple m of the sounding interval $T_s$ for a particular STA (e.g., STA-1 110-a in this example) as follows:

$$\Delta SNR_i^{(m)} = \frac{|S_i^{(t+mT_s)} V_i^{*(t+mT_s)} W^{(t)}|^2 - |S_i^{(t+(m-1)T_s)} V_i^{*(t+(m-1)T_s)} W^{(t)}|^2}{T_s}$$

The beamforming steering matrix $W^{(t)}$ is used in determining multiple SNR gradient metrics for a given STA 110. For example, even when a subsequent sounding procedure and MU-MIMO transmission for STA-1 does not include STA-2 or STA-3 (e.g., an MU-3 MU-MIMO transmission to STA-1 110-a, STA-5, and STA-6), the beamforming steering matrix $W^{(t)}$ calculated with respect to MU-3 MU-MIMO transmission to STA-1 110-a, STA-2, and STA-3 is used to determine SNR gradient metrics with respect to compressed feedback information received from subsequent channel sounding procedures. In this regard, the beamforming steering matrix $W^{(t)}$ serves as a temporary constant for determining multiple SNR gradient metrics in some embodiments.

For example, STA-1 110-a is moving 130-c as illustrated in FIG. 2. A first channel sounding procedure is initiated by AP 105-a when STA-1 110-a is at a first time and position 202. A second channel sounding procedure is initiated by AP 105-a at a subsequent time when STA-1 110-a is at a second time and position 204. The sounding interval $T_s$ is the time period between the first time and position 202 and the second time and position 204 of STA-1 110-a. The compressed beamforming information received by AP 105-a associated with STA-1 110-a at the first time and position 202 (e.g., $S_i^{(t)} V_i^{*(t)}$) and the compressed beamforming information received by AP 105-a associated with STA-1 110-a at the second time and position 204 (e.g., $S_i^{(t+T_s)} V_i^{*(t+T_s)}$) is used by AP 105-a to determine an SNR gradient metric associated with the sounding time interval $T_s$ (e.g., $\Delta SNR_i^{(1)}$).

A third channel sounding procedure is initiated by AP 105-a at a further subsequent time when STA-1 110-a is at a third time and position 206. A sounding duration of $2T_s$ is the time period between the first time and position 202 and the third time and position 206 of STA-1 110-*a*. The compressed beamforming information received by AP 105-*a* associated with STA-1 110-*a* at the first time and position 202 (e.g., $S_i^{(t)} V_i^{*(t)}$ and the compressed beamforming information received by AP 105-*a* associated with STA-1 110-*a* at the third time and position 206 (e.g., $S_i^{(t+2T_s)} V_i^{*(t+2T_s)}$) is used by AP 105-*a* to determine an SNR gradient metric associated with the sounding time interval $2T_s$ (e.g., $\Delta SNR_i^{(2)}$).

Additionally, AP 105-*a* determines an average SNR gradient metric over multiple consecutive VHT CBF reports for the same STA 110. For example, AP 105-*a* uses a moving average to determines the average SNR gradient metric over multiple consecutive VHT CBF reports for a given multiple m of the sounding interval $T_s$ as follows:

$$\Delta SNR_i^{(m)} = \alpha \left( \frac{\left| S_i^{(t+mT_s)} V_i^{*(t+mT_s)} W^{(t)} \right|^2 - \left| S_i^{(t+(m-1)T_s)} V_i^{*(t+(m-1)T_s)} W^{(t)} \right|^2}{T_s} \right) + (1-\alpha) \Delta SNR_i^{(m)}$$

Equation (1)

In this regard, additional matrix calculations for beamforming steering matrix $W^{(t)}$ are used to determine average SNR gradient metrics. For example, a series of SNR gradient metric calculations are determined using the beamforming steering matrix $W^{(t)}$ calculated with respect to MU-3 MU-MIMO transmission to STA-1 110-*a*, STA-2, and STA-3 and another series of SNR gradient metric calculations are determined using a beamforming steering matrix $W^{(t+x)}$ calculated with respect to a subsequent MU-3 MU-MIMO transmission to STA-1 110-*a*, STA-5, and STA-6. In these examples, the x in the beamforming steering matrix $W^{(t+x)}$ can be associated with multiple of the sounding interval, $nT_s$ (e.g., $2T_s$, $10T_s$, $30T_s$, etc.), and like durations of SNR gradient metrics (e.g., $T_s$, $2T_s$, $3T_s$, etc.) calculated using the beamforming steering matrix $W^{(t)}$ and the beamforming steering matrix $W^{(t+x)}$ are combined for the average gradient SNR metrics.

For example, in FIG. 2, the compressed beamforming information received by AP 105-*a* associated with STA-1 110-*a* at the second time and position 204 (e.g., $S_i^{(t+T_s)} V_i^{*(t+T_s)}$) and the compressed beamforming information received by AP 105-*a* associated with STA-1 110-*a* at the third time and position 206 (e.g., $S_i^{(t+2T_s)} V_i^{*(t+2T_s)}$) is used by AP 105-*a* to determine another SNR gradient metric associated with the sounding time interval $T_s$ (e.g., $\Delta SNR_i^{(1)}$). This SNR gradient metric (e.g., the $\Delta SNR_i^{(1)}$ metric obtained for the sounding time interval $T_s$ from the second time and position 204 to the third time and position 206) is, then averaged according to Equation (1) with the SNR gradient metric with the sounding time interval $T_s$ obtained from the compressed beamforming information received by AP 105-*a* associated with STA-1 110-*a* at the first time and position 202 (e.g., $S_i^{(t)} V_i^{*(t)}$) and the compressed beamforming information received by AP 105-*a* associated with STA-1 110-*a* at the second time and position 204 (e.g., $S_i^{(t+T_s)} V_i^{*(t+T_s)}$).

Characteristics of the disclosed equations for the SNR gradient metrics ($\Delta SNR_i^{(1)}$, $\Delta SNR_i^{(2)}$, $\Delta SNR_i^{(m)}$, and average $\Delta SNR_i^{(m)}$) as well as similar techniques as would be apparent to a skilled person given the benefit of the present disclosure include, but are not limited to: using a same beamforming steering matrix for determining multiple SNR gradient metrics; using different beamforming steering matrices for determining multiple SNR gradient metrics of a same sounding interval duration; using different feedback SNR values from different channel sounding procedures to determine an SNR gradient metric; and using different compressed feedback matrices from different channel sounding procedures to determine an SNR gradient metric.

AP 105-*a* uses the SNR gradient metrics to determine Doppler gradient metrics. AP 105-*a* uses the Doppler gradient metrics for implementing rate adaptation techniques (e.g., MCS determinations), for dynamically adapting the sounding intervals (e.g., modifying the sounding intervals for a STA 110 or group of STAs 110), and for categorizing STAs 110 for MU-MIMO groupings (e.g., grouping STAs 110 that have low Doppler gradients).

Figure 3A:
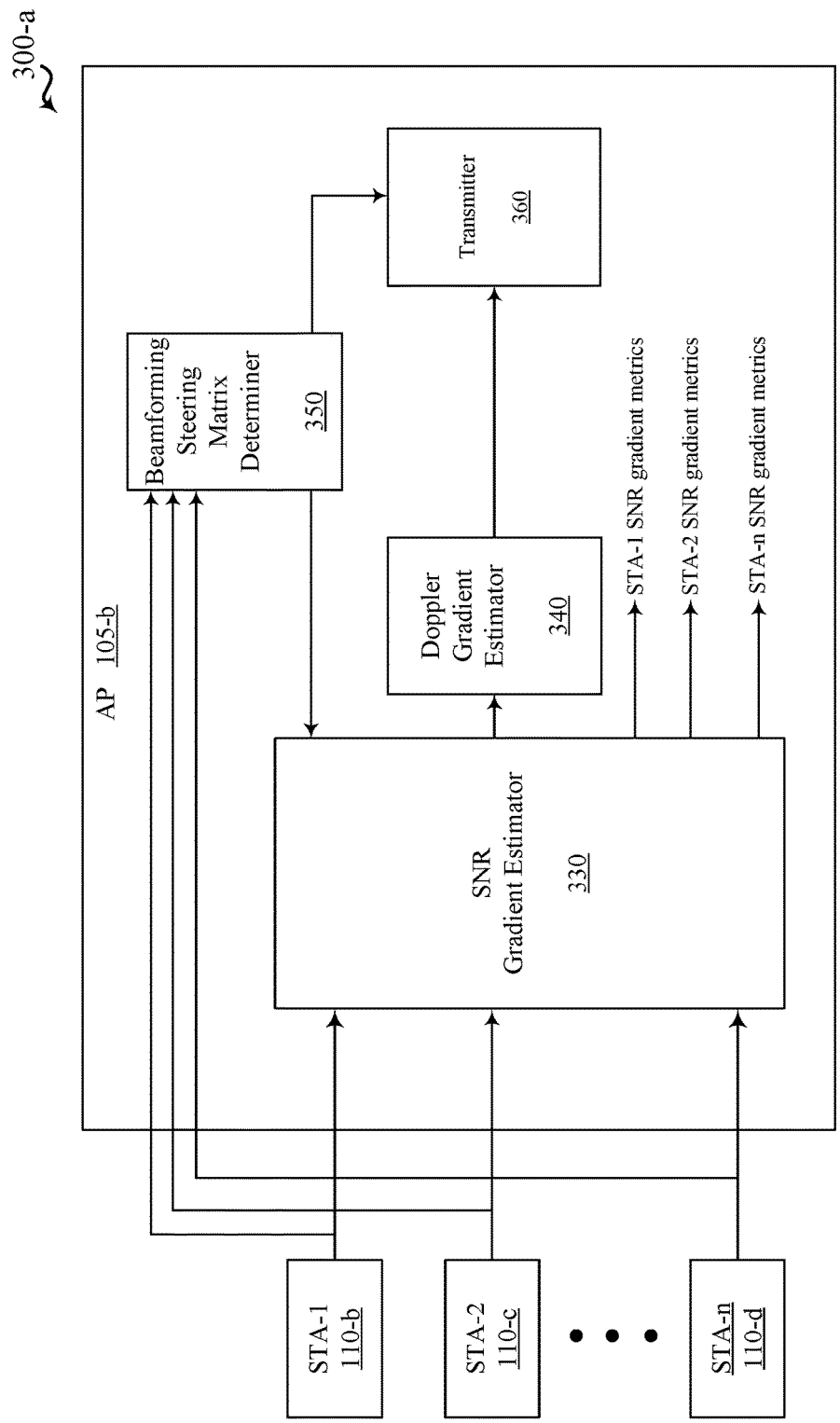
FIGS. 3A and 3B show block diagrams of examples of APs receiving compressed beamforming information from STAs and using the received compressed beamforming information for determining SNR gradient metrics and Doppler gradient metrics in accordance with various aspects of the present disclosure.

FIG. 3A shows a block diagram 300-*a* of an example of an AP receiving compressed beamforming information from STAs and using the received compressed beamforming information for determining SNR gradient metrics and Doppler gradient metrics in accordance with various aspects of the present disclosure. The example block diagram 300-*a* shown in FIG. 3A is illustrated with respect to AP 105-*b* and STAs 110-*b*, 110-*c*, 110-*d*, which are respective examples of the AP 105 and STAs 110 of FIGS. 1 and 2.

Each of STA-1 110-*b*, STA-2 110-*c*, and STA-n 110-*d* transmits compressed beamforming information to AP 105-*b*. SNR gradient estimator 330 of AP 105-*b* processes the received compressed beamforming information to determine SNR gradient metrics for each of STA-1 110-*b*, STA-2 110-*c*, and STA-n 110-*d*. Some of the received compressed beamforming information may be useable without being decompressed by AP 105-*a* (e.g., the average SNR per space-time stream, in the case of a SU transmission, which is sent as part of a VHT compressed beamforming report). Additionally or alternatively, a non-compressed beamforming report may be received. The SNR gradient metrics for each of STA-1 110-*b*, STA-2 110-*c*, and STA-n 110-*d* is determined as an estimate of the change in the SNR that the respective STA 110 would experience if AP 105-*b* were to perform a transmission to that respective STA 110 using a beamforming steering matrix $W^{(t)}$ (e.g., an MU-MIMO transmission for which the respective STA 110 is a member of the MU group or an SU transmission). The beamforming steering matrix determiner 350 also receives compressed beamforming information from each of STA-1 110-*b*, STA-2 110-*c*, and STA-n 110-*d*. Similarly, some of the received compressed beamforming information may be useable without being decompressed by AP 105-*a*. Additionally or alternatively, a non-compressed beamforming report may be received. The beamforming steering matrix $W^{(t)}$ is determined by beamforming steering matrix determiner 350 and provided to SNR gradient estimator 330. The beamforming steering matrix $W^{(t)}$ is also stored by AP 105-*b* for use in multiple calculations. As such, the rate of change of SNR for each of STA-1 110-*b*, STA-2 110-*c*, and STA-n 110-*d* is determined by AP 105-*b*.

AP 105-a can store compressed beamforming information received from the station over a period of time. For example, the SNR gradient $\Delta SNR_i^{(m)}$ over a specific multiple m of the sounding interval $T_s$ is averaged with gradients of different values of m up to a value of K to get one number, $\Delta SNR_i$, representing the overall SNR gradient in a total decision period $T_d$=$KT_s$ as follows:

$$\Delta SNR_i = \frac{1}{K}\sum_{m=1}^{K} \Delta SNR_i^{(m)}$$

For example, if K=3, $$\Delta SNR_i = \frac{1}{3}\sum_{m=1}^{3} \Delta SNR_i^{(m)} = \frac{|S_i^{(t+3T_s)} V_i^{*(t+3T_s)} W^{(t)}|^2 - |S_i^{(t)} V_i^{*(t)} W^{(t)}|^2}{3T_s}$$

which represents the overall SNR gradient over K=3 sounding intervals.

The selection of K and $T_d$ depends on the current sounding interval, $T_s$, and whether the current transmission is a single user (SU) transmission or multiple user (MU) transmission. MU transmissions are more sensitive to channel variations compared to SU transmission, and the sounding interval has to be adapted quickly if there is large channel variation, leading to a large SNR gradient. In one example implementation, the decision interval $T_d$=200 msec for SU transmissions and 80 msec for MU transmissions. Examples of values for the sounding interval include $T_s$=50 msec or 100 msec for SU transmission and $T_s$=10 msec, 20 msec, or 40 msec for MU transmission. Consequently, examples of values for K for SU include 4 or 2, and for MU include 8, 4, or 2 in this implementation example. This configuration enables decisions to be made more quickly for MU transmissions ($T_d$ for MU<$T_d$ for SU), as MU transmissions are more sensitive to channel variations, and with more reliability (larger K in general, depending on the current sounding interval) since the impact of a non-optimal decision would be larger for MU.

The SNR gradient metrics are provided to Doppler gradient estimator 340 of AP 105-b, which classifies the Doppler gradient of the wireless channel of STA-1 110-b, STA-2 110-c, and STA-n 110-d based at least in part on these SNR gradient metrics. Doppler gradient estimator 340 provides Doppler gradient metrics associated with each of STA-1 110-b, STA-2 110-c, and STA-n 110-d. For example, the Doppler gradient metrics are provided as Doppler classifications in some embodiments. Doppler gradient estimator 340 classifies Doppler gradient of the wireless channel as having a very low (e.g., static or near-static wireless channel), low, medium, or high (e.g., fast-fading channel) Doppler gradient characteristics. In some examples, Doppler gradient estimator 340 classifies the Doppler gradient as follows:

| $\Delta SNR_i$ | Doppler Classification |
|---|---|
| $0 < \Delta SNR_i < \Delta_1$ | Very Low |
| $\Delta_1 < \Delta SNR_i < \Delta_2$ | Low |
| $\Delta_2 < \Delta SNR_i < \Delta_3$ | Medium |
| $\Delta_3 < \Delta SNR_i < \Delta_4$ | High |

In some cases, the value for $\Delta_1$ is approximately 1 to 2 dB, the value for $\Delta_2$ is approximately 2 to 3 dB, the value for $\Delta_3$ is approximately 3 to 5 dB, and the value for $\Delta_4$ is approximately 5 to 10 dB. In some implementations, a $\Delta SNR_i$ value greater than $\Delta_4$ is deemed to be an anomalous or erroneous measurement and excluded (e.g., Doppler gradient metric is not utilized for that particular STA 110 in deciding various MIMO operations). In other implementations, a $\Delta SNR_i$ value greater than $\Delta_4$ is deemed to have a Doppler classification of "High."

It is to be appreciated that the number of distinct Doppler classifications is a design parameter and can vary depending to certain embodiments and implementations of Doppler gradient estimator 340 and AP 105-b.

When AP 105-b determines an MU-MIMO transmission group (or SU transmission) based at least in part on the determined Doppler gradient metrics, a beamforming steering matrix W is determined by beamforming steering matrix determiner 350, and the MU-MIMO transmission is performed by transmitter 360. The beamforming steering matrix W relates to a specific transmission at that instance in time, and while the beamforming steering matrix W could be the same as those used in the SNR gradient metric calculations (e.g., beamforming steering matrices $W^{(t)}$ and $W^{(t+x)}$), the beamforming steering matrix W for the specific transmission need not necessarily be the same.

Figure 3B:
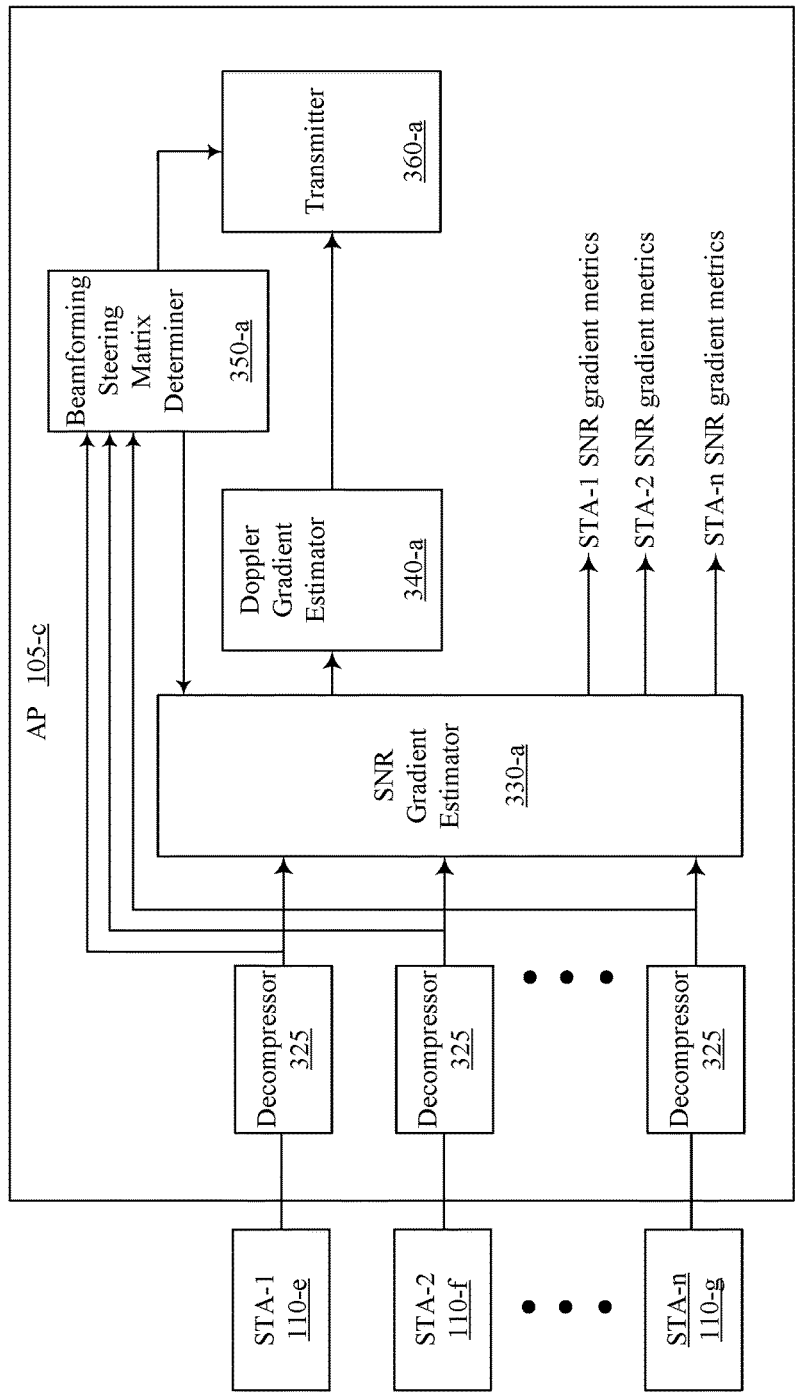

FIG. 3B shows a block diagram 300-b of an example of an AP receiving compressed beamforming information from STAs and using the received compressed beamforming information for determining SNR gradient metrics and Doppler gradient metrics in accordance with various aspects of the present disclosure. The example block diagram 300-b shown in FIG. 3B is illustrated with respect to AP 105-c and STAs 110-e, 110-f, 110-g, which are respective examples of the AP 105 and STAs 110 of FIGS. 1 and 2.

Each of STA-1 110-e, STA-2 110-f, and STA-n 110-g transmits compressed beamforming information to AP 105-c. Decompressor(s) 325 of AP 105-c decompresses the received compressed beamforming information. For example, decompressor 325 of AP 105-c decompresses compressed feedback matrices based at least in part on angles (e.g., phi $\Phi$ and psi $\Psi$ angles) associated with the rows and columns of each compressed feedback matrix V to obtain a decompressed beamforming matrix (e.g., feedback matrix V*) after decompression and reconstruction for each of STA-1 110-e, STA-2 110-f, and STA-n 110-g.

SNR gradient estimator 330-a of AP 105-b processes the received compressed beamforming information that has been decompressed by decompressor(s) 325 to determine SNR gradient metrics for each of STA-1 110-e, STA-2 110-f, and STA-n 110-g. The SNR gradient metrics for each of STA-1 110-e, STA-2 110-f, and STA-n 110-g is determined as an estimate of the change in the SNR that the respective STA 110 would experience if AP 105-c were to perform a transmission to that respective STA 110 using a beamforming steering matrix $W^{(t)}$ (e.g., an MU-MIMO transmission for which the respective STA 110 is a member of the MU group or an SU transmission). The beamforming steering matrix determiner 350-a also receives compressed beamforming information that has been decompressed by decompressor(s) 325. The beamforming steering matrix $W^{(t)}$ is determined by beamforming steering matrix determiner 350-a and provided to SNR gradient estimator 330-a. The beamforming steering matrix $W^{(t)}$ is also stored by AP 105-c for use in multiple calculations. As such, the rate of change of SNR for each of STA-1 110-e, STA-2 110-f, and STA-n 110-g is determined by AP 105-c.

The SNR gradient metrics are provided to Doppler gradient estimator 340-a of AP 105-c, which classifies the Doppler gradient of the wireless channel of STA-1 110-e, STA-2 110-f, and STA-n 110-g based at least in part on these SNR gradient metrics. Doppler gradient estimator 340-a provides Doppler gradient metrics associated with each of STA-1 110-e, STA-2 110-f, and STA-n 110-g. For example, the Doppler gradient metrics are provided as Doppler classifications in some embodiments. Doppler gradient estimator 340-a classifies Doppler gradient of the wireless channel as described above with respect to Doppler gradient estimator 340.

Still referring to FIG. 3B, AP 105-c uses the determined Doppler gradient metrics for each of STA-1 110-e, STA-2 110-f, and STA-n 110-g for implementing rate adaptation techniques (e.g., MCS determinations). In some cases, an optimal rate for physical layer convergence procedure (PLCP) protocol data units (PPDUs) between consecutive channel sounding procedures depends on how fast the wireless channel changes after the channel sounding procedure. For a fast fading or fast varying wireless channels, the MCS for an STA 110 is expected to drop at a fast rate. For slowly varying or static wireless channels, that MCS for an STA 110 is expected to drop at a slow rate or not drop at all.

In some examples, AP 105-c uses the determined Doppler gradient metrics to adapt the MCS of one or more of STA-1 110-e, STA-2 110-f, and STA-n 110-g for transmission of PPDUs between sounding intervals. If the Doppler gradient metric for a particular STA 110 is very low (e.g., a slow varying or static wireless channel), AP 105-c decrements the MCS for that particular STA 110 by a very low value (e.g., a $dM_1$ value of 1) keeps it the same. If the Doppler gradient metric is high (e.g., a fast fading or fast varying wireless channel), AP 105-c decrements the MCS for that particular STA 110 by a high value (e.g. a $dM_4$ value between 3 to 6).

As such, when the Doppler gradient estimator 340-a classifies the Doppler gradient metric as 'very low', AP 105-c decrements the MCS for that particular STA 110 by a first value (e.g., $dM_1$). When the Doppler gradient estimator 340-a classifies the Doppler gradient metric as 'low', AP 105-c decrements the MCS for that particular STA 110 by a second value (e.g., $dM_2$) greater than or equal to the first value. When the Doppler gradient estimator 340-a classifies the Doppler gradient metric as 'medium', AP 105-c decrements the MCS for that particular STA 110 by a third value (e.g., $dM_3$) greater than or equal to the second value. And, when the Doppler gradient estimator 340-a classifies the Doppler gradient metric as 'high', AP 105-c decrements the MCS for that particular STA 110 by a fourth value (e.g., $dM_4$) greater than or equal to the third value.

As similarly noted above with respect to the number of distinct Doppler classifications, the number of distinct decrement values (e.g., $dM_x$ values) and the values thereof are design parameters and can vary depending to certain embodiments and implementations of Doppler gradient estimator 340-a and AP 105-c.

By contrast, certain intra-sounding MCS rate adaptation techniques (e.g., rate adaptation for PPDUs between two consecutive channel sounding procedures) is based solely on instantaneous PER calculated based on block acknowledgements from the STAs 110. In some embodiments, a combination of PER-based techniques and Doppler gradient metric techniques described herein can be employed by AP 105-c.

AP 105-c also uses the determined Doppler gradient metrics for each of STA-1 110-e, STA-2 110-f, and STA-n 110-g for dynamically adapting the sounding intervals (e.g., modifying the sounding intervals for a STA 110 or group of STAs 110).

If the Doppler gradient metric for a particular STA 110 is very low (e.g., a slow varying or static wireless channel), AP 105-c selects a longer sounding interval (e.g., a $T_1$ value of 4 times to 16 times of the sounding interval $T_s$) associated with that particular STA 110. In such cases, AP 105-c experiences higher throughput rates due at least in part to less sounding overhead associated with the STAs 110 that have very low Doppler gradient metrics.

However, if the Doppler gradient metric is high (e.g., a fast fading or fast varying wireless channel), AP 105-c selects a shorter sounding interval (e.g., a $T_4$ value equal to the current sounding interval $T_s$ or a sounding interval shorter than the current sounding interval $T_s$) associated with that particular STA 110. In such cases, AP 105-c more effectively tracks wireless channel variations and avoid having sudden increases in PER based at least in part on stale wireless channel information.

As such, when the Doppler gradient estimator 340-a classifies the Doppler gradient metric as 'very low', AP 105-c selects a first value (e.g., $T_1$) for the sounding interval for that particular STA 110. When the Doppler gradient estimator 340-a classifies the Doppler gradient metric as 'low', AP 105-c selects a second value (e.g., $T_2$) for the sounding interval for that particular STA 110, where the second value is less than or equal to the first value. When the Doppler gradient estimator 340-a classifies the Doppler gradient metric as 'medium', AP 105-c selects a third value (e.g., $T_3$) for the sounding interval for that particular STA 110, where the third value is less than or equal to the second value. And, when the Doppler gradient estimator 340-a classifies the Doppler gradient metric as 'high', AP 105-c selects a fourth value (e.g., $T_4$) for the sounding interval for that particular STA 110, where the fourth value is less than or equal to the third value.

As similarly noted above with respect to the number of distinct Doppler classifications, the number of distinct sounding interval values (e.g., $T_x$ values) and the values thereof are design parameters and can vary depending to certain embodiments and implementations of Doppler gradient estimator 340-a and AP 105-c.

AP 105-c uses the determined Doppler gradient metrics for each of STA-1 110-e, STA-2 110-f, and STA-n 110-g for categorizing STAs 110 for MU-MIMO groupings (e.g., grouping STAs 110 that have low Doppler gradients). Doppler gradient metrics provide an indication about how fast the channel changes and, thus, how fast an associated signal-to-interference-plus noise ratio (SINR) and MCS for a particular STA 110 would change. Thus, AP 105-c uses Doppler gradient metrics in combination with queue depth and MCS rates, for example, to determine MU-MIMO groupings of STAs 110.

For example, AP 105-c initially determines a candidate MU-MIMO group to include STA-1 110-e, STA-2 110-f, and STA-3 based on queue depth and MCS rates. In this example, STA-1 110-e has a most current MCS of 7, STA-2 110-f has a most current MCS of 8, and STA-3 110 has a most current MCS of 7. Each of STA-1 110-e and STA-2 110-f has a Doppler gradient metric classified as low'. However, STA-3 has a Doppler gradient metric classified as 'High'. Although the most-current MCS value for STA-3 110 is 7, the Doppler gradient metric indicates a fast fading or fast varying wireless channel associated with STA-3. As such, the actual MCS for STA-3 110 at the time for sending the MU-MIMO transmission is predicted to drop to 5 or 4.

Thus, AP 105-c determines to remove STA-3 110 from the candidate MU-MIMO group and performs the MU-MIMO transmission with an MU-2 grouping including only STA-1 110-e and STA-2 110-f, or modifies the MU-3 grouping to include another STA 110 that has a Doppler gradient metric classified as 'Very low' or low'. Moreover, based at least in part on the Doppler gradient metric classification of 'High' for STA-3 110, AP 105-c may schedule STA-3 for an SU transmission.

When AP 105-c determines an MU-MIMO transmission group (or SU transmission) based at least in part on the determined Doppler gradient metrics, a beamforming steering matrix W is determined by beamforming steering matrix determiner 350-a, and the MU-MIMO transmission is performed by transmitter 360-a.

It is to be appreciated that the block diagrams 300-a and 300-b of FIGS. 3A and 3B are some examples of APs 105 that use compressed or noncompressed beamforming information to determine Doppler gradient metrics, and other wireless communication devices can implement the techniques described herein. Wireless communication devices (including APs 105) determine SNR gradient and Doppler gradient metrics can be used for other MIMO operations in a similar manner as the examples for implementing rate adaptation techniques, for dynamically adapting the sounding intervals, and for categorizing STAs 110 for MU-MIMO groupings as described herein.

Figure 4A:
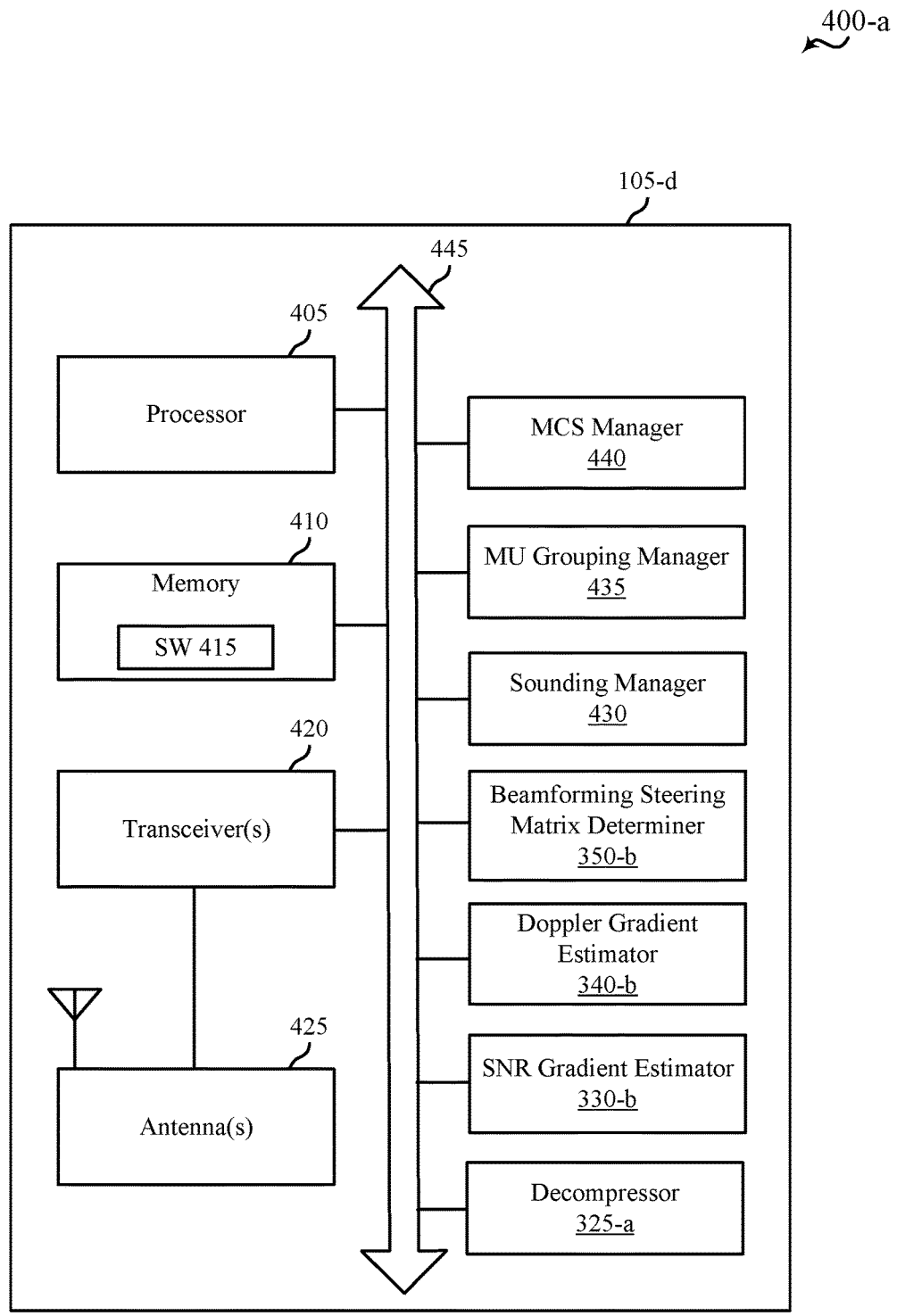
FIGS. 4A and 4B show block diagrams of examples of an AP that supports using compressed beamforming information to estimate Doppler profiles in accordance with various aspects of the present disclosure.

FIG. 4A shows a block diagram 400-a of an example AP 105-d that supports using compressed beamforming information for estimating Doppler profiles in accordance with various aspects of the present disclosure, and with respect to FIGS. 1-3B. The AP 105-d includes a processor 405, a memory 410, one or more transceivers 420, one or more antennas 425, a sounding manager 430, an MU grouping manager 435, an MCS manager 440, a decompressor 325-a, an SNR gradient estimator 330-b, a Doppler gradient estimator 340-b, and a beamforming steering matrix determiner 350-b. The processor 405, memory 410, transceiver(s) 420, sounding manager 430, MU grouping manager 435, MCS manager 440, decompressor 325-a, SNR gradient estimator 330-b, Doppler gradient estimator 340-b, and beamforming steering matrix determiner 350-b are communicatively coupled with a bus 445, which enables communication between these components. The antenna(s) 425 are communicatively coupled with the transceiver(s) 420.

The processor 405 is an intelligent hardware device, such as a central processing unit (CPU), a microcontroller, an application-specific integrated circuit (ASIC), etc. The processor 405 processes information received through the transceiver(s) 420 and information to be sent to the transceiver(s) 420 for transmission through the antenna(s) 425.

The memory 410 stores computer-readable, computer-executable software (SW) code 415 containing instructions that, when executed, cause the processor 405 or another one of the components of the AP 105-e to perform various functions described herein, for example, receiving compressed beamforming information for a number of STAs 110 and determining SNR gradient and Doppler gradient metrics associated with the STAs 110.

The transceiver(s) 420 communicate bi-directionally with other wireless devices, such as STAs 110, other APs 105, or other devices. The transceiver(s) 420 include a modem to modulate packets and frames and provide the modulated packets to the antenna(s) 425 for transmission. The modem is additionally used to demodulate packets received from the antenna(s) 425.

The sounding manager 430, MU grouping manager 435, MCS manager 440, decompressor 325-a, SNR gradient estimator 330-b, Doppler gradient estimator 340-b, and beamforming steering matrix determiner 350-b implement the features described with reference to FIGS. 1-3B, as further explained below.

Again, FIG. 4A shows only one possible implementation of a device executing the features of FIGS. 1-3. While the components of FIG. 4A are shown as discrete hardware blocks (e.g., ASICs, field programmable gate arrays (FPGAs), semi-custom integrated circuits, etc.) for purposes of clarity, it will be understood that each of the components may also be implemented by multiple hardware blocks adapted to execute some or all of the applicable features in hardware. Alternatively, features of two or more of the components of FIG. 4A may be implemented by a single, consolidated hardware block. For example, a single transceiver 420 chip may implement the processor 405, sounding manager 430, MU grouping manager 435, MCS manager 440, decompressor 325-a, SNR gradient estimator 330-b, Doppler gradient estimator 340-b, and beamforming steering matrix determiner 350-b.

Figure 4B:
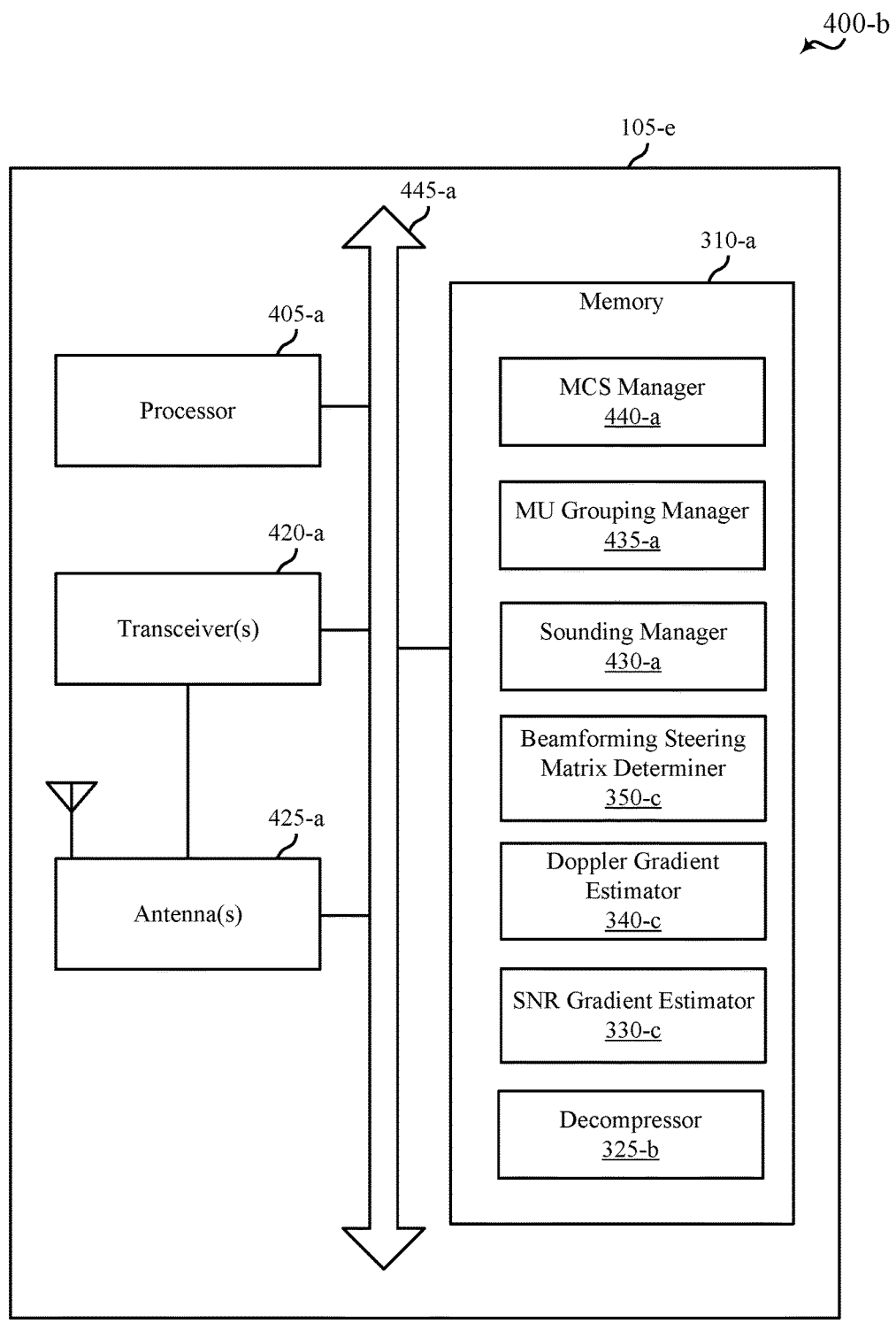

In still other examples, the features of each component may be implemented, in whole or in part, with instructions embodied in a memory, formatted to be executed by one or more general or application-specific processors. For example, FIG. 4B shows a block diagram 400-b of another example of an AP 105-e in which the features of the sounding manager 430-a, MU grouping manager 435-a, MCS manager 440-a, decompressor 325-b, SNR gradient estimator 330-c, Doppler gradient estimator 340-c, and beamforming steering matrix determiner 350-c are implemented as computer-readable code stored on memory 410-a and executed by one or more processors 405-a. Other combinations of hardware/software may be used to perform the features of one or more of the components of FIGS. 4A and 4B.

Figure 5:
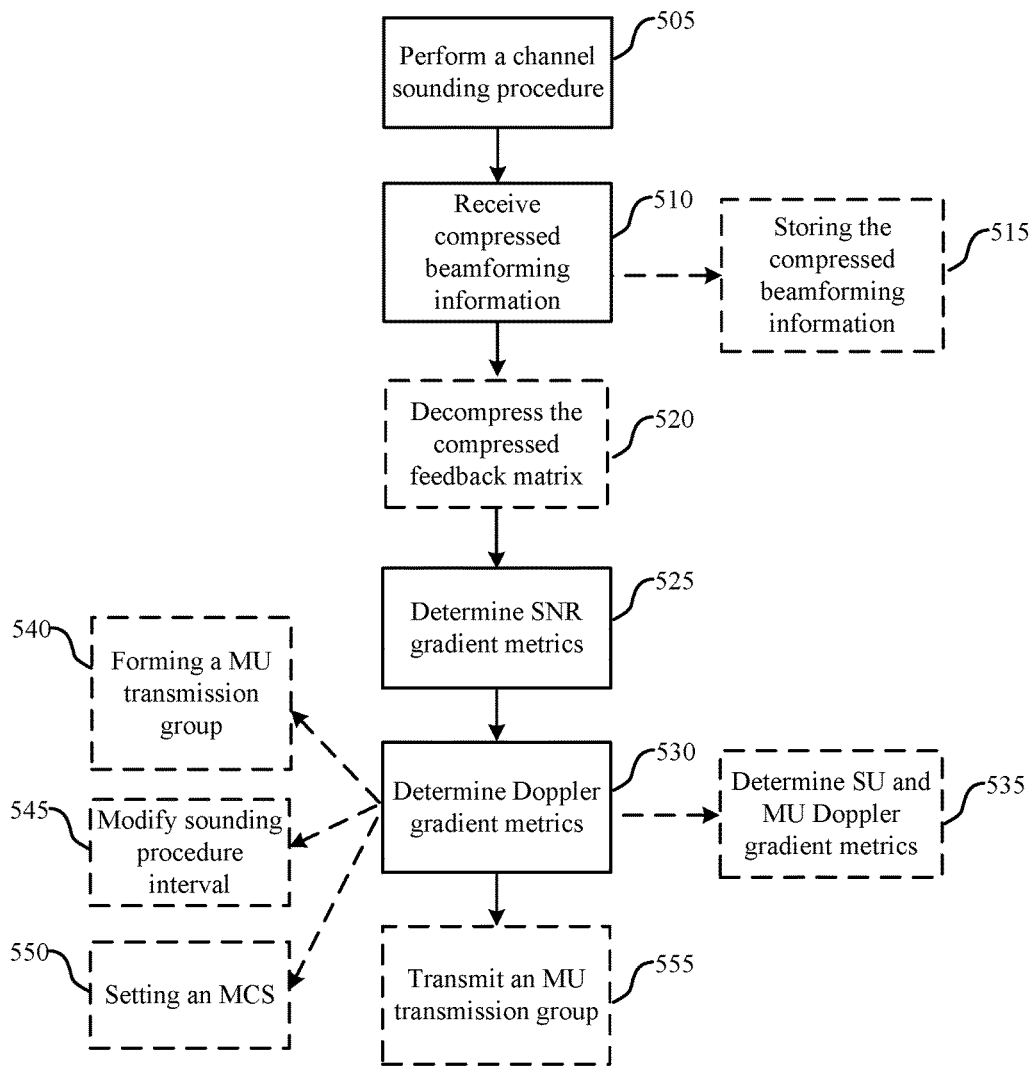
FIG. 5 shows a flow chart that illustrate examples of methods for using compressed beamforming information to estimate Doppler profiles in accordance with various aspects of the present disclosure.

FIG. 5 shows a flow chart that illustrates one example of a method 500 for using compressed beamforming information for estimating Doppler profiles in accordance with various aspects of the present disclosure. Method 500 may be performed by any of the APs 105 and STAs 110 discussed in the present disclosure, but for clarity method 500 will be described from the perspective of AP 105-d of FIG. 4A as the beamformer wireless device and the STAs 110 of FIGS. 1-3B as the beamformee wireless devices. It is to be understood that method 500 is just one example of techniques for using compressed beamforming information to determine SNR gradient metrics and Doppler gradient metrics, and the operations of the method 500 may be rearranged, performed by other devices and component thereof, and/or otherwise modified such that other implementations are possible.

Broadly speaking, the method 500 illustrates a procedure by which the AP 105-d receives compressed beamforming information from multiple stations, the compressed beamforming information containing a feedback SNR value and compressed feedback matrix. The method 500 determines one or more SNR gradient metrics for the station based at least in part on the received feedback SNR values and the received compressed feedback matrices. The one or more SNR gradient metrics for the station can be used by themselves or used to determine a Doppler gradient metric based at least in part on the one or more SNR gradient metrics.

At block 505, transceiver 420 of the AP 105-d performs a channel sounding procedure. The channel sounding procedure includes the transmission of a Null Data Packet (NDP) Announcement frame to identify stations selected as beamformees. The transceiver 420 then transmits a NDP with containing training fields that are known to the stations.

At block 510, the transceiver 420 receives compressed beamforming information from each of a plurality of stations. A first one of the stations provides compressed beamforming information in response to the NDP, and other ones of the stations provide the compressed beamforming information sequentially in response to individual beamforming report poll frames sent by the transceiver 420 of the AP 105-*d*. For example, the compressed beamforming information for a station includes a feedback signal-to-noise ratio (SNR) value and compressed feedback matrix. The compressed beamforming information received by AP 105-*d* from the station is received over the period of time. In this regard, compressed beamforming information, in aggregate as received over the period of time and that is used to determine the one or more SNR gradient metrics for the station, is associated with a plurality of consecutive sounding procedures performed by AP 105-*d* with respect to the station.

In one option, at block 515, memory 410 of AP 105-*d* stores the compressed beamforming information from the station received over the period of time, as discussed above. For example, memory 410 stores the received compressed beamforming information from each of the plurality of stations and/or beamforming information associated with the received compressed beamforming information that has been decompressed by AP 105-*d*.

At block 520, according to one option, decompressor 325-*a* decompresses the compressed feedback matrix. Additionally, in some options, various interpolation, filtering, coding, and phase-shifting operations can be performed to reconstruct SV* information. As noted above, in some examples, this decompressed feedback information is stored in memory 410 of AP 105-*d*.

According to one option, at block 525, SNR gradient estimator 330-*b* of AP 105-*d* determines one or more SNR gradient metrics for the station based at least in part on the received feedback SNR values and the received compressed feedback matrices. The SNR gradient metrics for the station and the plurality of stations are determined according to the principles described in FIGS. 1-3B. In some examples, SNR gradient estimator 330-*b* determines the one or more SNR gradient metrics for the station by averaging a plurality of SNR gradient values associated with a particular time interval.

At block 530, Doppler gradient estimator 340-*b* determines a Doppler gradient metric based at least in part on the one or more SNR gradient metrics for the station. Similarly, Doppler gradient estimator 340-*b* determines Doppler gradient metrics based at least in part on the SNR gradient metrics for each of the plurality of stations. The Doppler gradient metrics for the station and the plurality of stations are determined according to the principles described in FIGS. 1-3B.

According to a one option, at block 535, SNR gradient estimator 330-*b* determines one or more single-user SNR gradient metrics associated with single-user transmissions for the station, and in turn, Doppler gradient estimator 340-*b* determines a single-user Doppler gradient metric based at least in part on the single-user SNR gradient metrics. According to another option, SNR gradient estimator 330-*b* determines one or more multi-user SNR gradient metrics associated with multi-user transmissions for the station, and in turn, Doppler gradient estimator 340-*b* determines a multi-user Doppler gradient metric based at least in part on the multi-user SNR gradient metrics. In yet another option, at block 535, the SNR gradient estimator 330-*b* determines different first multi-user SNR gradient metrics for multi-user transmissions associated with different numbers of stations (e.g., an MU-2 SNR gradient metric for multi-user transmissions having a total of two stations, an MU-3 SNR gradient metric for multi-user transmissions having a total of three stations, an MU-4 SNR gradient metric for multi-user transmissions having a total of four stations, . . . , an MU-7 SNR gradient metric for multi-user transmissions having a total of seven stations, and/or an MU-8 SNR gradient metric for multi-user transmissions having a total of eight stations).

With respect to AP 105-*d* using the Doppler gradient metrics, at block 540, MU grouping manager 435 forms a multi-user transmission group of the station based at least in part on a classification of the Doppler gradient metric in accordance with a first option. In some cases, MU grouping manager 435 schedules the multi-user transmission group such that each station in the multi-user transmission group has the same classification of the Doppler gradient metric. According to a second option, at block 545, sounding manager 430 modifies a sounding procedure interval of the station based at least in part on a classification of the Doppler gradient metric. According to a third option, at block 550, MCS manager 440 sets a modulation and coding scheme of the station based at least in part on a classification of the Doppler gradient metric.

At block 555, in accordance with some examples, AP 105-*e* transmits a multi-user transmission group or a single-user transmission from the station based at least in part on the determined Doppler gradient metric.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
receiving, by a first wireless device, beamforming information reports from a station over a period of time, each beamforming information report including a feedback signal-to-noise ratio (SNR) value and compressed feedback matrix; and
determining a change in SNR between two beamforming information reports for the station, wherein the change is determined based at least in part on the received feedback SNR values and the received compressed feedback matrices.

2. The method of claim 1, further comprising:
determining a Doppler gradient metric based at least in part on the change in SNR between the two beamforming information reports.

3. The method of claim 2, further comprising:
setting a modulation and coding scheme of the station based at least in part on a classification of the Doppler gradient metric.

4. The method of claim 2, further comprising:
modifying a sounding procedure interval of the station based at least in part on a classification of the Doppler gradient metric.

5. The method of claim 2, further comprising:
forming a multi-user transmission group of the station based at least in part on a classification of the Doppler gradient metric.

6. The method of claim 1, wherein determining the change in SNR for the station comprises averaging a plurality of SNR values associated with a particular time interval.

7. The method of claim 1, wherein determining the change in SNR for the station comprises determining a single-user SNR associated with single-user transmissions.

8. The method of claim 1, wherein determining the change in SNR for the station comprises determining a multi-user SNR associated with multi-user transmissions.

9. The method of claim 1, wherein determining the change in SNR for the station comprises determining different multi-user SNRs for multi-user transmissions associated with different numbers of stations.

10. The method of claim 1, wherein the beamforming information reports from the station received over the period of time are associated with a plurality of sounding procedures associated with the station.

11. The method of claim 1, further comprising:
storing the feedback SNR values and received compressed feedback matrices received from the station over the period of time.

12. A communications device, comprising:
a transceiver to receive beamforming information reports from a station over a period of time, each beamforming information report including a feedback signal-to-noise ratio (SNR) value and compressed feedback matrix; and
an SNR estimator to determine a change in SNR between two beamforming information reports for the station, wherein the change is determined based at least in part on the received feedback SNR values and the received compressed feedback matrices.

13. The communications device of claim 12, further comprising:
a Doppler gradient estimator to determine a Doppler gradient metric based at least in part on the change in SNR between the two beamforming information reports.

14. The communications device of claim 13, further comprising:
a modulation and coding scheme manager to set a modulation and coding scheme of the station based at least in part on a classification of the Doppler gradient metric.

15. The communications device of claim 13, further comprising:
a sounding manager to modify a sounding procedure interval of the station based at least in part on a classification of the Doppler gradient metric.

16. The communications device of claim 13, further comprising:
a multi-user grouping manager to form a multi-user transmission group of the station based at least in part on a classification of the Doppler gradient metric.

17. The communications device of claim 12, wherein the SNR estimator to determine the change in SNR for the station is further to average a plurality of SNRs associated with a particular time interval.

18. The communications device of claim 12, wherein the SNR estimator to determine the change in SNR for the station is further to determine a single-user SNR associated with single-user transmissions.

19. The communications device of claim 12, wherein the SNR estimator to determine the change in SNR for the station is further to determine a multi-user SNR associated with multi-user transmissions.

20. The communications device of claim 12, wherein the SNR estimator to determine the change in SNR for the station is further to determine different multi-user SNRs for multi-user transmissions associated with different numbers of stations.

21. The communications device of claim 12, wherein the beamforming information reports from the station received over the period of time are associated with a plurality of sounding procedures associated with the station.

22. The communications device of claim 12, further comprising:
memory to store the feedback SNR values and received compressed feedback matrices received from the station over the period of time.

23. A communications device, comprising:
means for receiving beamforming information reports from a station over a period of time, each beamforming information report including a feedback signal-to-noise ratio (SNR) value and compressed feedback matrix; and
means for determining a change in SNR between two beamforming information reports for the station, wherein the change is determined based at least in part on the received feedback SNR values and the received compressed feedback matrices.

24. The communications device of claim 23, further comprising:
means for determining a Doppler gradient metric based at least in part on the change in SNR between the two beamforming information reports.

25. The communications device of claim 24, further comprising:
means for setting a modulation and coding scheme of the station based at least in part on a classification of the Doppler gradient metric.

26. The communications device of claim 24, further comprising:
means for modifying a sounding procedure interval of the station based at least in part on a classification of the Doppler gradient metric.

27. The communications device of claim 24, further comprising:
means for forming a multi-user transmission group of the station based at least in part on a classification of the Doppler gradient metric.

28. The communications device of claim 23, wherein the means for determining the change in SNR for the station comprises means for averaging a plurality of SNR values associated with a particular time interval.

29. A non-transitory computer-readable medium storing code for wireless communication, the code comprising instructions executable to cause at least one communications device to:
receive beamforming information reports from a station over a period of time, each beamforming information report including a feedback signal-to-noise ratio (SNR) value and compressed feedback matrix; and
determine a change in SNR between two beamforming information reports for the station, wherein the determination is based at least in part on the received feedback SNR values and the received compressed feedback matrices.

30. The non-transitory computer-readable medium of claim 29, wherein the code further comprises instructions executable to cause the at least one communications device to:
determine a Doppler gradient metric based at least in part on the change in SNR between the two beamforming information reports.

* * * * *